United States Patent [19]

Britos

[11] Patent Number: 4,803,312

[45] Date of Patent: Feb. 7, 1989

[54] INTERFACE BETWEEN PERSONAL COMPUTER AND TELEX COMMUNICATION SYSTEM

[75] Inventor: Jose D. Britos, Córdoba, Argentina

[73] Assignee: Asecom S.C.L., Cordoba, Argentina

[21] Appl. No.: 47,935

[22] Filed: May 7, 1987

[30] Foreign Application Priority Data

May 16, 1986 [AR] Argentina ............................ 303987

[51] Int. Cl.⁴ .......................................... H04L 13/08
[52] U.S. Cl. .................................... 178/17 R; 178/4
[58] Field of Search ................... 178/17, 3, 2 R, 17.5, 178/17 C, 4; 375/7, 8

[56] References Cited

U.S. PATENT DOCUMENTS

| 3,307,152 | 2/1967 | Robbins | 340/172.5 |
| 3,587,044 | 6/1971 | Jenkins | 340/146.1 |
| 3,936,600 | 2/1976 | Galbraith | 178/17.5 |
| 4,047,159 | 9/1977 | Boudry | 364/900 |
| 4,156,932 | 5/1979 | Robinson et al. | 364/200 |
| 4,388,683 | 6/1983 | Beifuss et al. | 364/200 |
| 4,419,736 | 12/1983 | Christensen et al. | 364/900 |
| 4,477,695 | 10/1984 | Buck | 178/3 |
| 4,484,306 | 11/1984 | Kulczyckyi et al. | 364/900 |

Primary Examiner—Stafford D. Schreyer
Attorney, Agent, or Firm—Kuhn and Muller

[57] ABSTRACT

An intelligent interface to enable a personal computer or the like to be used as a telex transceiver.

15 Claims, 5 Drawing Sheets

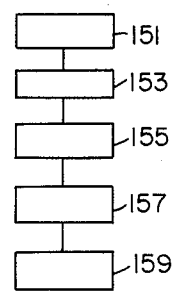
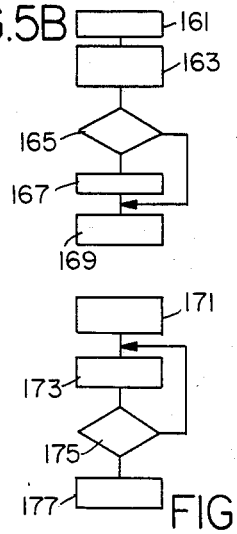
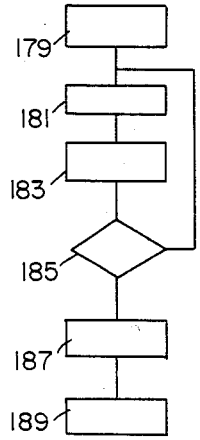
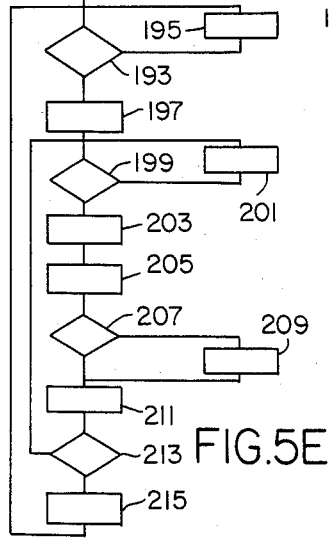
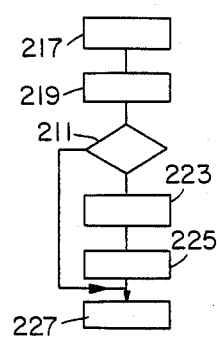
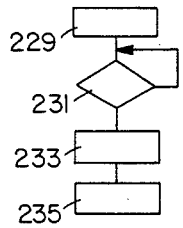
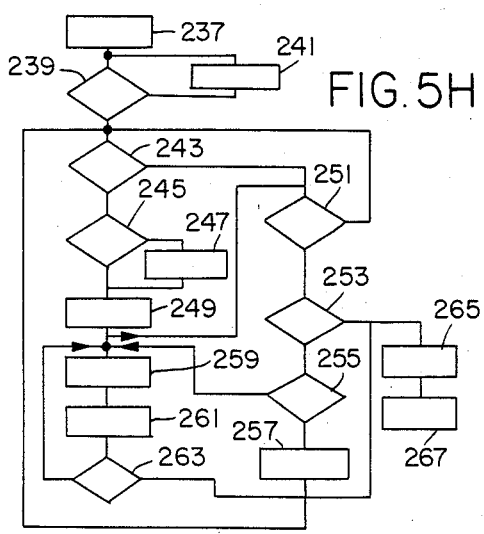
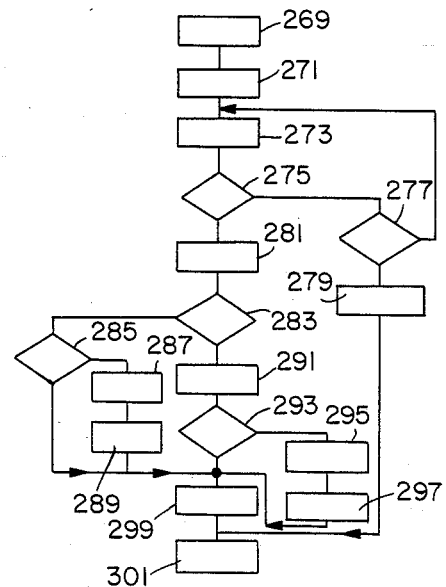

INTERFACE BETWEEN PERSONAL COMPUTER AND TELEX COMMUNICATION SYSTEM

FIELD OF THE INVENTION

This invention is related to the transmission and reception of texts, according to the CITT norms. In particular, it relates to a device which is connected to a communication line allowing a personal computer or the like to operate as a transceiver instrument for the transmission and reception of telex texts thus making possible the use of a personal computer or a similar apparatus as a transceiver of telex.

BACKGROUND OF THE INVENTION

The international and widely used telex service basically consists of an interchange over long distances of typewritten texts. This service uses the existing communication network making it possible to send through this network a series of characters which include the capital letters of the alphabet, the ordinal numbers, some punctuation marks and certain special characters, which must be duly shaped into a format and interchanged according to a protocol established in the CITT V 10 norm and S.15 and V.1 recommendations.

According to the transmission protocol, the interchange of indicatives (known internationally as "answerbacks") at the beginning and at the end of each transmission, ensuring that the message was wholly transmitted to the correct addressee, is a norm. The format of transmission is based on the Baudot code, which uses digital words of 5 parallel bits, their interpretation depending on the sequence of transmission or on a bit incorporated to that effect.

The conventional transceiver of telex is a typewriter on whose keyboard the text is written, this text appearing printed in the distant teleprinter of the addressee, whose printer automatically types the text manually entered on the keyboard of the typewriter or distant telex of the sender. In addition, the telex instrument incorporates some devices to dial the addressees, to establish communication and to verify the identity (i.e. the "answerback") of the same and to code and transmit the texts, as well as receiving and decoding the texts transmitted to them through the same medium.

The increase in the availability and possibilities of acess by diverse types of users of certain types of computers becomes more evident every day, specifically in the case of those known as "personal computers". These devices are used more and more by professionals and small enterprises, as well as being employed as peripherals in sophisticated computer systems with access to sources of data.

The conventional telex transceivers are, as well as every type of office machine in general, relatively expensive instruments, so that their incorporation by a small enterprise, even if it is quite desirable, in most of the cases must be carefully evaluated as regards their cost.

SUMMARY OF THE INVENTION

An object of this invention is to benefit from the possession of a personal computer or the like to obtain an apparatus which complies with all the functions of a telex transceiver at a lower cost than in the case of a conventional teleprinter.

Another object of this invention is to transform a personal computer or the like into a telex transceiver without interfering with its ability to comply with other specific functions for which it has been primarily intended.

Still another object of this invention is to provide an intelligent interface that allows the connection of a standard input/output device such as a user terminal of a personal computer or the like to communication lines in order to transform it into a telex transceiver.

All those elements a transceiver of telex requires in order to communicate with other users that is: a keyboard, a screen (cathode ray tube) and a printer, are present as peripherals in the usual common configuration of a personal computer or the like. In view of these circumstances, this invention aims to take advantage of these peripherals, providing an intelligent interface which makes it possible to use a standard input/output device such as a user terminal, of a personal computer or the like for the transmission and receiving of telex messages.

The interface of this invention is based upon a micro data processing device, which comprises a central processing unit having a program memory, a data memory, timer and synchronizer (timing and sequence control) elements, as well as output and input ports; means connecting these ports to intercommunicating data and command signals, and with the computer and the telex communication network respectively. In the micro data processing device of the interface of the present invention there are storage blocks of memory reserved for the texts of messages that are going to be sent, another memory storage for the texts that are being received, or which have already been received and not yet discharged by the computer, and a memory in which the machines number and answerback of machines are registered. Optionally, it is possible to include a memory storage for a dispatch schedule, making it possible to send telex messages at deferred hours, and a memory storage with addressees' telex numbers, accessible in such a way that it becomes unnecessary to inut the number and the answerback of the addressee, it being verified by the computer by means of a predetermined reference.

Communication of the interface input/output port with the telex communication line is done through a line exciter and a relay and connecting unit which closes the line to enable the interface to receive the telex signals. For this last mentioned function, the interface of this invention also includes a call detector which interconnects with the communication line, commanding the connecting unit to close the line when a call is received from a telex machine. Another port lets the central processing unit communicate with the computer by means of signals codified in ASCII.

The central processing unit is programmed to comply with the functioning of the interface in two different modes of operation: i.e. reception and transmission of telex signals. The interface enters into the reception mode when the call detector perceives a calling signal in the communication line and closes the connecting unit to permit the detection of data. In the reception mode, once the communication is established, the telex signals are converted in a receiving element that transforms the signal codified in Baudot into a signal in code ASCII for its processing and storage on the part of the micro data processing device. The micro data processing device analyzes the characters to detect if they are either the part of a text or if, on the other hand, it is a command, which may be an end of message instruction, a request for transmission of the anserback, or an error message. If it is a useful text, the micro data processing device sends it to the received text memory. If on the other hand it is a command: the answerback is sent if it is a request for answerback; the circuit of the connecting unit is opened if it is an end of message command after the previous transmission of its own indicative; and attention is paid to the informed condition of error, storing the error message if one is received.

There are two different ways of telex transmission. One of them is by way of direct command coming from the computer; the other one is done at a predetermined time established beforehand by the computer in the sending schedule memory of the interface. The micro processing data device also comprises means which enable the sending of a given text to a plurality of addressees previously registered, having automatic dialing and redialing.

The central processing unit also possesses the means to obtain the text to be transmitted from the appropriate emerging text memory and to send it through a data bus to a transmitting phase which transforms the ASCII code into the Baudot code. Besides, the central processing unit performs other functions related to the transmission of the text, such as obtaining the telex number of the addressee from the subscriber number memory, transforming it into a dial signal which is sent through the exciter and subsequently, after establishing the communication, sending a request for the answerback and then comparing the answer with the correct one. If the answerback is not verified as being correct, the communication must be interrupted by opening the connecting unit and then proceeding automatically to a new dialing.

Also, the micro data processing device of the interface has the necessary means to communicate with the computer through the input/output (I/O) port with the aid of serial to parallel (S/P) and parallel to serial (P/S) converters to obtain from the computer, and to store, the texts to be transmitted, to transmit to the computer the received texts and to receive the texts of addressees at the time of transmission. Within this context, the micro data processing device has its own intelligence, which allows it to operate permanently in the mode of transmission, reception, waiting or watching; communicating only from time to time with the computer when it is required by it to do so. This is an important characteristic which rarely distracts the computer for the telex service and makes it possible to use it for other jobs. The telex interface can also function with the computer off.

Preferably, the call detector, the connecting unit and the line exciter are designed in such a way that, whenever it is necessary, they are able to provide a galvanic isolation between the interface of this invention and the communication line to which it is coupled, in order to protect the interface from transitory elements of high energy content that may occur in the telex line.

BRIEF DESCRIPTION OF THE DRAWINGS

Other objects, features and advantages of the invention will be readily apparent from the following description of a preferred embodiment thereof, taken in conjunction with the accompanying drawings, although variations and modifications may be effected without departing from the spirit and scope of the novel concepts of the disclosure, and in which.

DESCRIPTION OF THE PREFERRED EMBODIMENTS

Figure 1:
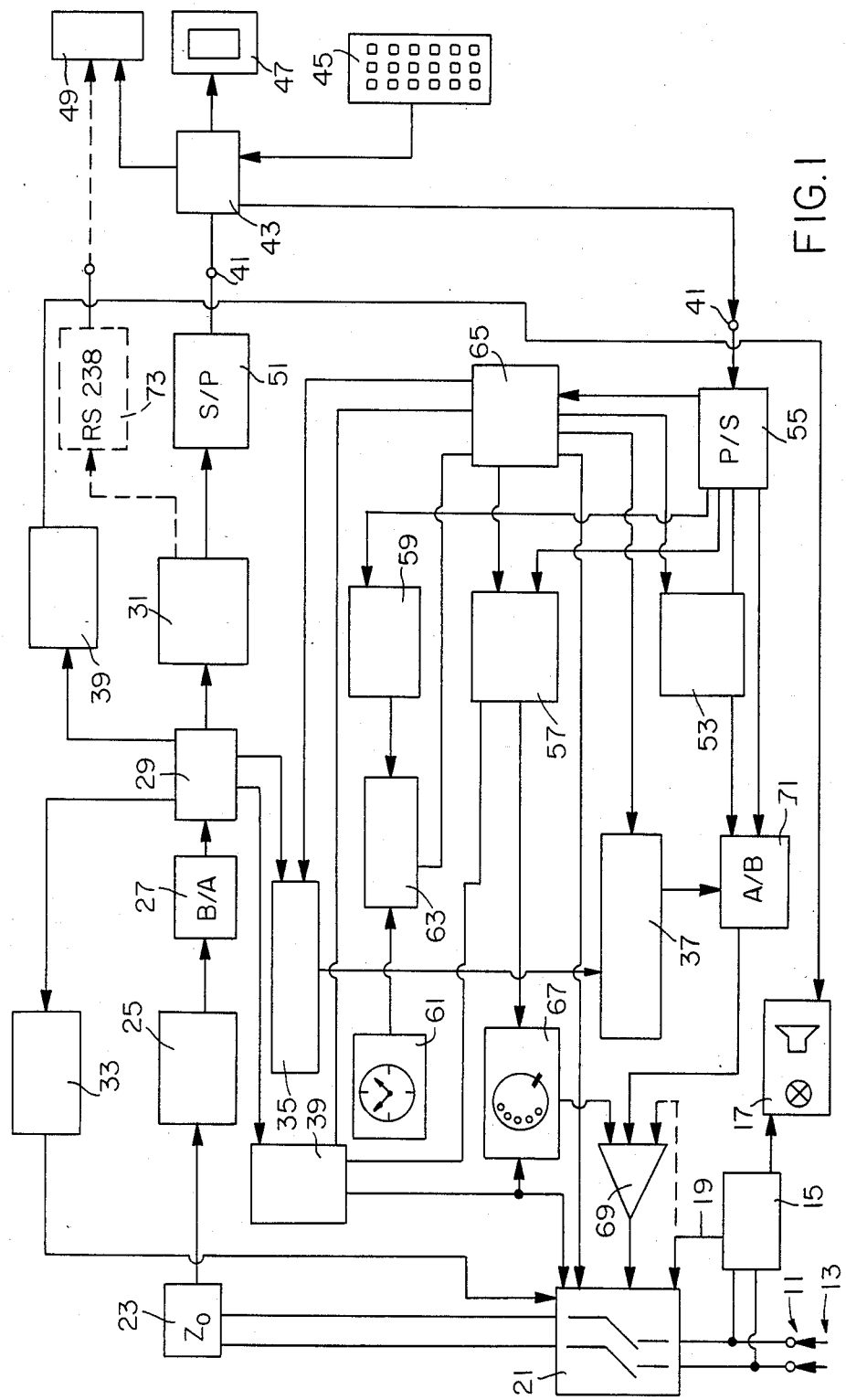
FIG. 1 is a schematic block diagram of the interface of this invention, illustrating the implementation and functioning of the same.

Referring to FIG. 1, terminals 11 make possible the connection to a communication line 13, of a call detector 15, which detects the polarity of line 13. When a call is made, the telex central changes the polarity of line 13 causing the detector 15 to activate a sound and light indicator 17 and, by means of a line 19, it closes a relay and connecting unit 21, placed on line 13. The function of the connecting unit 21 is the opening and closing of line 13 through an impedance of terminal 23, so that the telex central may have line 13 open or closed, according to the situation.

A signal coming in through line 13, when it is closed, is detected by a data receiver 25, which transmits it to a code converter 27 that converts the incoming signal codified in Baudot into a signal in ASCII (B/A). After its conversion, the signal in ASCII is transmitted to a character analyzer 29 that determines whether it is a useful text or a command. The command could be an end of message order, the answerback of the other machine, or a request for the machines own answerback. If it is useful text, the same signal is passed together with the sender's answerback to received text memory 31. If the signal is the end of a message command, end of message circuit detector 33 passes a signal to release communication line 13, by opening the relay of connecting unit 21; if it is the case of a request for the machines own answerback, a request circuit 35 is in charge of putting the interface in the transmission mode and transmitting the answerback which is stored in answer back memory 37, as will be explained in detail hereinafter. The subscriber's answerback can also be received on the other side of line 13, in which case answerback verifier 39 proceeds to compare it with the correct answerback.

The interface is connected through the connectors 41 to a computer 43, for example a WANG PS. In a conventional configuration, computer 43 is connected to several peripherals; in this case a keyboard 45, similar to a common typewriter, a luminous screen 47 of the type included in a cathode ray tube (CRT) and a printer 49 that can be of the dot matrix type or an alpha numeric character printer. Computer 43 is programmed to read the text stored in received text memory 31 through a serial to parallel (S/P) converter 51 and to transmit (and preferably, also read) a text to emerging text memory 53 through a parallel to serial (P/S) converter 55.

Subscriber number memory 57 contains the most common subscribers' telex numbers and answerbacks in such a way that computer 43 can select a subscriber by means of a preestablished reference with no need of entering its number and answerback through keyboard 45.

Also considered is the possibility of transmitting telex texts at deferred hours for the purpose of benefiting from night hours reduced charge rate, or else to take advantage of diverse time zones, for which there is provided a time memory 59, where deferred transmission starting times are stored. That is to say, for each text being stored in memory emerging text 53 it is possible to select one subscriber, or a list of them; from memory subscriber number 57 and a transmission schedule from time memory 59.

To transmit telex on a deferred schedule, the interface includes a clock 61, having its own time base and being able to deliver a signal representative of the actual time. A comparator 63 is activated every time a schedule time stored in time memory 59 coincides with the actual time given by clock 61, alerting the interface to begin a sequence of transmission.

To operate in the transmission mode, the interface includes sequence control 65 to command a transmission sequence which begins with an instruction to subscriber number memory 57 which selects the proper subscriber addressee's number, sending it to a dial 67 which can transmit service requests to the telex central in an entirely automatic way. The interface has an output section terminating at an exciter 69 which is connected to the line in such a way that it can modulate the line signal in accordance with the emerging text signal. Exciter 69 may be of the three states type ("tri-state"), whose output is connected directly to line 13, which is normally in a high impedance state. Alternatively, as illustrated in this figure of the drawing, exciter 69 operates a plate relay ("reed switch") in connecting unit 21, opening and closing line 13 in accordance with the signal to be transmitted. In this last operation, it is possible to connect the call detector 15 to command connecting unit 21 to close line 13 by sending a proper activating signal to the input of exciter 69.

Also, exciter 69 receives data from transmitter 71, which includes an ASCII to Baudot converter (A/B), capable of transmitting answerbacks and texts from memories 37, 53 and 57.

The telex central answers the service request, inverting telex line 13 to inform sequence control 65 that it must proceed to the dialing. Sequence control 65, according to the instructions received from the computer 43 via converter (P/S) 55, can perform the following functions:

Dialling the telex number from the computer: the number is entered on keyboard 45 and computer 43 transmits it through converters 55 and 71 in order to convert it first from serial to parallel, then from ASCII (parallel) to Baudot and finally to a serial format at exciter 69 for transmission;

Automatic dialling starting from the number memory 57: in this case, sequence control 65 selects the subscriber's number from memory 57 and passes it to converter 71 and to exciter 69;

Automatic dialling: This is commanded by a signal from comparator 63 when the real hour clock signal from clock 61 corresponds to the hour signal from memory 59;

Automatic dialling and transmission of telex stored in the memory: In this case, sequence control 65 extracts the subscriber number from subscriber number memory 57 and the text previously stored from emerging text memory 53, passing these through converter 71 and exciter 69;

Automatic dialling: A certain telex stored in memory 53 is sent to a pre-established list of telex numbers previously stored in subscriber number memory 57. Once the communication is established, sequence control 65 commands answerback memory 37 to pass the answerback through converter 71 and exciter 69, which will send through line 13 the answerback to the called remote machine and will also ask for the answerback of the called machine. When the called telex machine answers with its own answerback, this is detected by receiver 25 and character analyzer 29 which commands the verifier 39 to confirm the answerback. In case of an error, the verifier 39 orders connecting unit 21 to open the line, which can be done by disconnecting it by way of exciter 69. If it is correct, the verifier 39 tells sequence 65 to go on with the text. In this event emerging text memory 53 sends the stored text, or text coming directly from computer 43 is sent, according to the corresponding instruction, it being successively converted into Baudot code and to a serial format and fed to exciter 69, so that it may modulate the line with the signal representing the outgoing text. Once the text is finished, the end of message command is sent. The receiving machine answers with its answerback, which confirms that the text was fully received by the correct subscriber; after which the order to open line 13 will be generated, thus completing the transmission cycle.

In the reception mode, the communication is established by the call of another subscriber. Once the telex communication line 13 is activated by the telex central, data receiver 25 detects the input pulses, converter 27 transforms them into code ASCII for their interpretation by means of character analyzer 29, which will distribute them according to their content, until the end of message detector 33 marks the end of the transmission.

The texts passed by character analyzer 29 to received text memory 31 are stored in this memory for their subsequent recovery by means of computer 43, or through serial communication port 73, having suitable RS 232 connection 72, if there is a printer 49 connected in line with the interface.

Figure 2A:
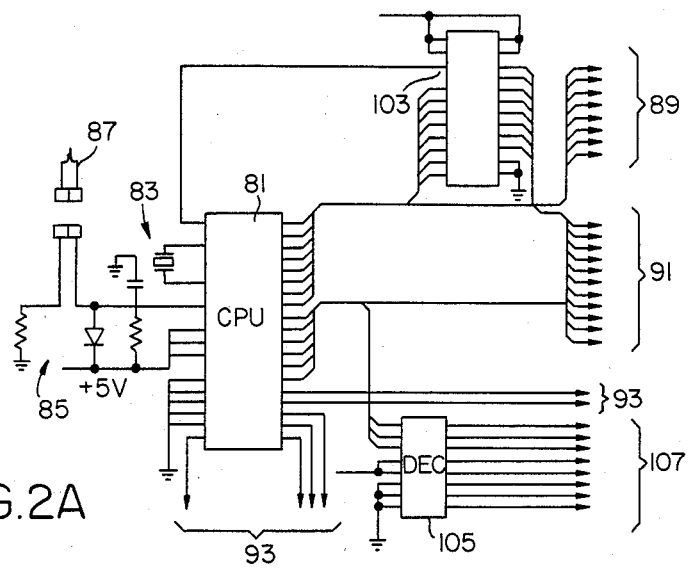
FIGS. 2A and 2B are diagrams of the network of circuits ("hardware"), in accordance with the interface of the invention.
Figure 2B:
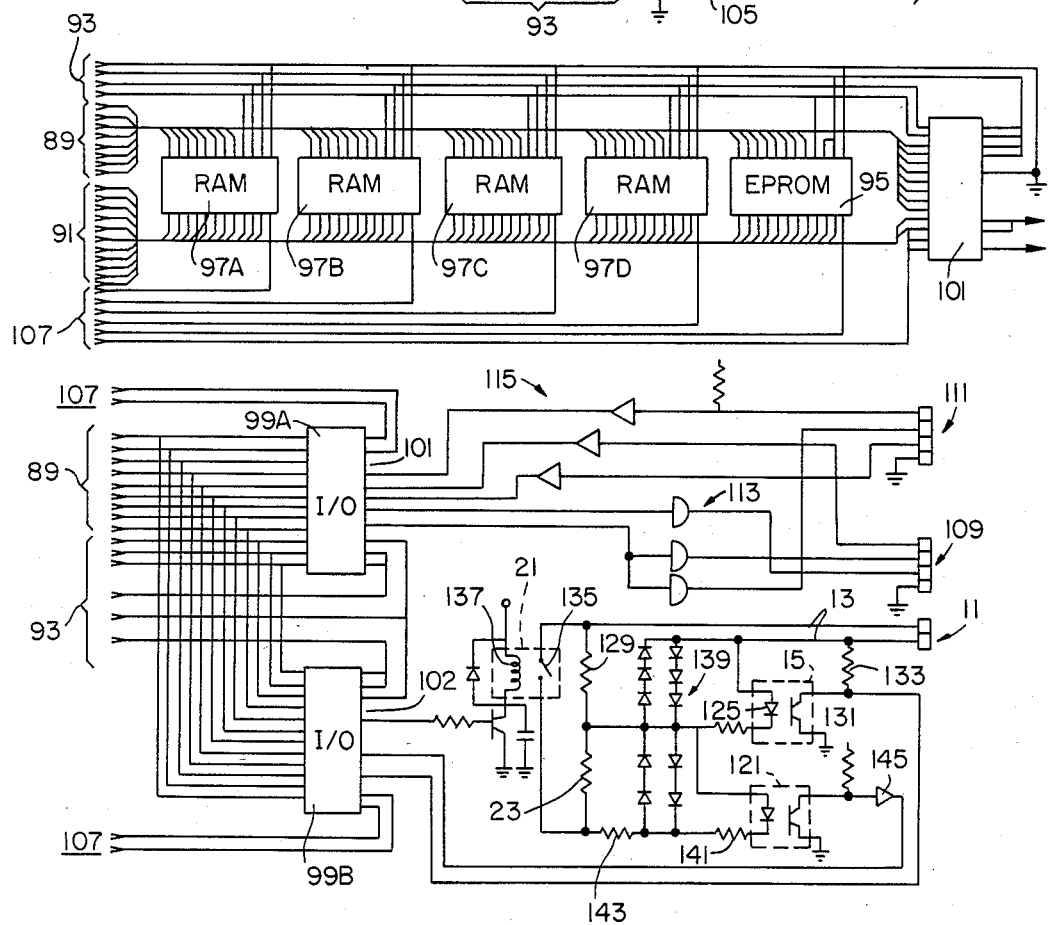

In FIGS. 2A and 2B, there is shown a diagram of the circuit network for the intelligent interface of the invention ("hardware"). The intelligent interface of the invention works around a micro data processing device (CPU) 81 that in the embodiment herein described is an 8-bit micro data processing device, model 8085 of the Intel Corporation.

Connected to the central processing unit (CPU) 81 is a crystal 83 which sets the time base to synchronize and chronologize diverse functions; a reposition circuit 85 which results the interface to a predetermined initial state by the pressing of a pulse button 87; and bus connections 89, 91, 93 with which the central processing unit 81 communicates with the other components of the processing machine. These bus connections include a bus or group of data lines, (D0-7) 89, a bus or group of direction lines (A0-10) 91 and a bus or group of control lines 93 with which the micro data processing device synchronizes and chronologizes access to/or from its components. Among this last bus connection of lines 93, is included the pair of writing lines and reading lines (WR and RD) which define the data traffic sense for bus connection 89, synchronism line (CK) and reposition lines (RST).

Central processing unit 81 is connected by means of the aforementioned bus connectors 89, 91, 93 to its memory banks 95, 97A-D and to its input and output ports (I/O) 99A and 99B. The memory banks include a permanent program read only memory 95 of 2 Kbytes where the program for the micro processing device is stored, and a data storage random access memory 97A–D of 8 Kbytes. The program memory 95 is provided with an Intel integrated circuit. Model 2716 that is a programmable read only memory which is erasable by means of ultraviolet radiation (UV EPROM), and is made up by about 2K by 8-bit.

Data storage memory 97A–D comprises four Motorola integrated circuits, Model 6116 each of 2048 by 8 bits of capacity, thereby to provide a random access memory (RAM) of 8K by 8 bits. With this configuration, central processing unit 81 performs every order of instruction present in program memory 95 and stores data in memories 97A, 97B, 97C and 97D for use in accordance with the program.

The micro data processing device (CPU) 81 communicates with computer 43 (FIG. 1) through a serial type linking according to norm RS232 connected to port 99A. This port, 99A, is provided with a universal synchronous and asynchronous transceiver (USART) Intel type, Model 8251 indicated at 100.

The micro data processing device 81 also includes a programmable timer 101, provided with an Intel integrated circuit, Model 8253, that includes three independent counters of 16 bits, each being able to count in binary numbers or in BCD according to programmable ways of counting. The time base of the synchronism pulses (CK), which are necessary for an eact generation of transmission speed between the interface of this invention and computer 43, is 4,800 bauds, whereas for the communication with telex line 13 it is 50 bauds.

Communication with line 13 is done through port 99B which is connected to another USART 102 of the Intel type 8251, an integrated circuit which generates the transmission protocol and codifies the signal to be transmitted in accordance with norm CCITT VI0 and recommendation S.15 and V.1. Due to the time base obtained starting from crystal 83 and programmable timer 101, the CITT norm requisites have been widely complied with.

Due to the fact that central processing unit 81, Intel type 8085, has its eight direction lines of minor significance A0–7 temporarily multiplexed with data bus 89, a demultiplexer 103 has been incorporated, having an 8-bit Intel Model 8212 input/output port. Its outputs feed the eight direction lines 91 of minor significance A0–7. Direction lines of major significance, lines A11-13, of bus 91 are connected to the input of an Intel Model type 8205, binary decoder 105, which receives the three major significance direction lines (A11–13) with which eight different positions may be modified, and it provides eight individual activation circuit (CE) 107 outputs to selectively activate memories 95, 97A, 97B, 97C, 97D, and ports 99A, 99B to couple them to direction bus 91 and data bus 89.

Both intercommunication ports 99A and 99B have an input C/D, which is connected to the less significant direction line (A0), and that determines if the data transferred by data bus 91 belong to the internal message data register to be transmitted, or if they are control signals. In the case of port 99A, these are data received or transmitted by computer 43 through connectors 109, 111 by means of their buffer amplifiers 113, 115 for the receiving and transmitting of data and commands.

Port 99B couples the intelligent interface of this invention with telex line 13 through a connector 11. Port 99B is connected to line 13 by means of three circuits: a polarity (call) detector 15; a connecting unit 21; and a line exciter 69.

Polarity detector 15 comprises a photoemissive diode 125 in circuit with a current limiting resistor 127 of 100 Ohms, that closes the other line of connecting unit relay 21 by means of a resistor 129, having 20 Ohms resistance and 2 watts dissipation power. When line 13 gets one of its two possible polarities, photoemissive diode 125 conducts and emits light energy to a phototransistor 131, saturating it and forming a logic zero in a data set readiness input of port 99B. When line 13 has the opposite polarity, an elevating resistor 133 keeps up input (DSR) in a logic one.

Receiver port 99B being ready to receive the telex data coming through line 13, commands the closing of a contact 135 of a plate relay of connecting unit 21 exciting a transistor of exciter 69 by means of its data transmission output (TXD). The closing of contacts 135 inserts an impedance 23 of 100 Ohms as a termination of line 13, which is detected by the telex central to signal the beginning of data transmission. The pulses coming in are applied across antiparallel diode circuit 139, protecting the (call) polarity detector 15, opto-coupled unit 121, a pair of resistors 141, 143 (of 22 and 190 Ohms, respectively) and the relay of connecting unit 21. The pulses counted by opto-coupled unit 121 are passed through a refusing gate isolation amplifier 145 and a data receiving input of port 99B.

Feeding of the data to be transmitted by line 13 is done through port 99B output (TXD), exciting transistor 69 and connecting unit 21, in such a way that connecting unit 21 selectively opens and closes line 13 upon termination impedance 23 and diodes 139 connected in antiparallel.

Figure 3A:
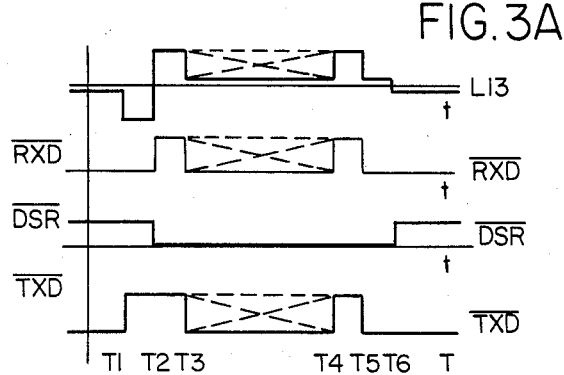
FIGS. 3A, 3B and 4 are time diagrams, concerning the operation of the interface.

These operations are reflected in the time diagrams included in the drawing. In FIG. 3A is illustrated a transmission mode sequence for a telex central of class "A". Time T1 corresponds to the closing of telex line 13 as a consequence of the feeding of data transmission (TXD) which causes the closing of contacts 135, to which the central answers by reversing telex line 13 polarity at time T2, exactly as it is informed by input (DSR) to port 99B. Signal voltage variation on telex line 13 is signalled in the diagram with ordinate V13. Then the transmission sequence follows, indicating at time T3, the ending of the first bit and time T4, the beginning of the last bit, which corresponds to the end of message signal. After this, the interface generates the command for opening line 13 at time T5, keeping the line free at time T6, as shown in FIG. 3A.

Figure 3B:
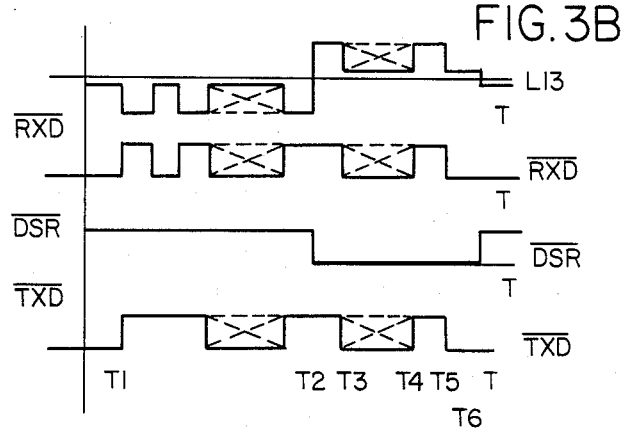
Figure 4:
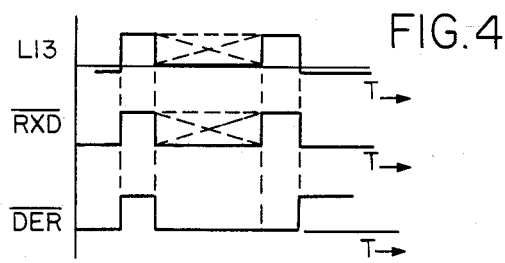

FIG. 3B illustrates a similar sequence, but this one corresponds to telex central class "B", the interpretation of this FIG. 3B being similar to the one for FIG. 3A. FIG. 4 shows the time diagram of the telex connection in the reception mode. At time T1'. the telex central changes polarity V13 of telex line 13, which is detected by line DSR, which alerts port 99A to begin to receive the data signal starting from T'2, as it is shown by the signal diagram on line RxD, the last bit of end of message being transmitted at time instant T'5 and the connection finished at time instant T'6.

Figure 5J:
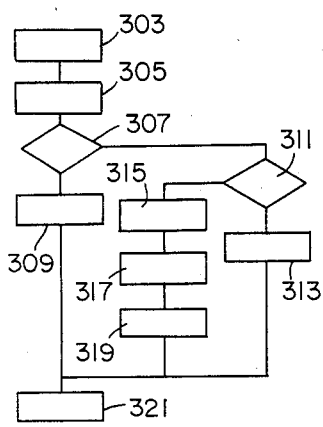
FIGS. 5A to 5S are flow diagrams for the program commanding the interface micro data processing machine.
Figure 5K:
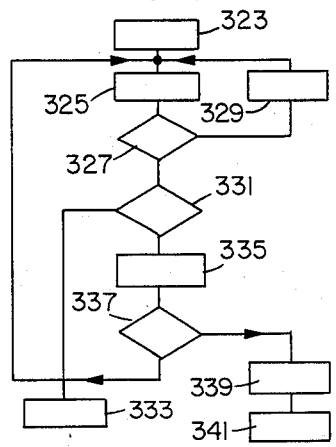
Figure 5L:
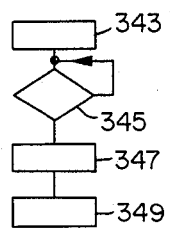
Figure 5M:
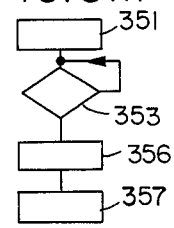
Figure 5N:
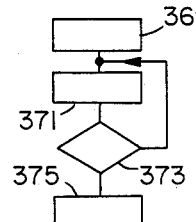
Figure 5O:
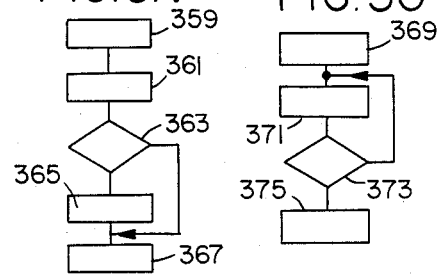
Figure 5P:
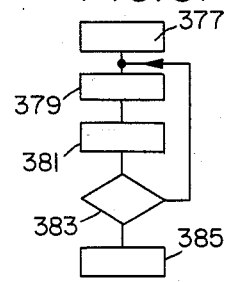
Figure 5Q:
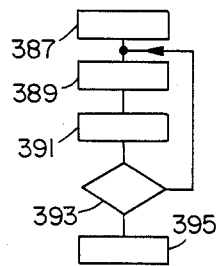
Figure 5R:
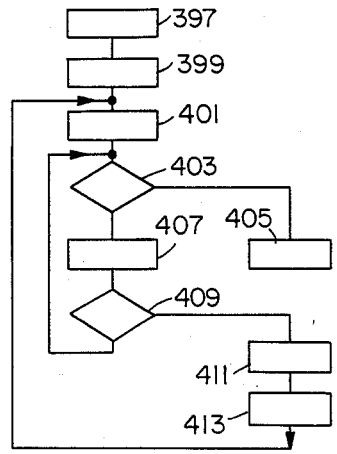

FIGS. 5A to 5Q, show the algorithmm flow diagrams of the content of read only memory (ROM) 95. Following is a description of the flow diagrams of the routines and subroutines related to the intelligent interface of this invention.

FIG. 5A: Starting Routine:

Phase 151: Peripherals 99A, 99B are programmed.
Phase 153: Variables are initialized in RAM 97.
Phase 155: The register of telexes and of telexes to be sent from memories 97 is cleared out.
Phase 157: A message asking for instructions is sent to computer 43.
Phase 159: A skip is made to the telex reception routine.

FIG. 5B: This routine asks if the erasing of the received telex register is desirable.

Phase 161: Subroutine MPR1 is called.
Phase 163: The answer, with which a return was made from the previous phase subroutine MPR1, is picked up.
Phase 165: It is asked if the answer is affirmative, otherwise following phase 167 is skipped, going directly to phase 169.
Phase 167: The received telex register is erased.
Phase 169: Return.

FIG. 5C: Subroutine to show question on screen 47 (MPRE1):

Phase 171: The number of characters to be shown on the screen is initialized.
Phase 173: A character is sent to the screen.
Phase 175: It is asked if it is the last one, otherwise a return is made to the previous 173.
Phase 177: Return.

FIG. 5D: Subroutine to transmit answerback (TKIMD):

Phase 179: The number of characters to be sent is initialized.
Phase 181: A memory Baudot code character is read.
Phase 183: The character read in the previous phase 181 is transmitted through port 99B.
Phase 185: It is asked if it is the last character. Otherwise the sequence is repeated from phase 181 inclusive.
Phase 187: Change to letter is transmitted.
Phase 189: Return.

FIG. 5E: Telex Reception Routine (TEBU):

Phase 191: The received telexes register is erased.
Phase 193: It is inquired from polarity detector 15 and from input DSR of port 99B if lines 13 are inverted. Otherwise, a skip is made to phase 197.
Phase 195: A call is made to the subroutine that tests computer 43 input and a return is made to phase 193.
Phase 197: Telex line 13 is closed.
Phase 199: It is asked if a telex character has arrived. If it is so, a skip is made to phase 203.
Phase 201: Computer 43 input testing subroutine is called and a return is made to phase 199.
Phase 203: The telex character is read.
Phase 205: The received telex indicator is lighted.
Phase 207: The received character is identified to verify if it is the Maltese Cross. Otherwise, the following phase 20 is skipped over.
Phase 209: The indicative is transmitted (Subroutine TXIMD: Design 5D).
Phase 211: After conversion from Baudot into ASCII, it is stored in the register.
Phase 213: It is asked if it is the end of the telex. Otherwise, the sequence is repeated from phase 199 inclusive.
Phase 215: Telex line 13 is opened.

FIG. 5F: Routine to transmit a character through telex line 13 (TXCH):

Phase 217: The registers are initialized.
Phase 219: Subroutine TXOUT is called (Design 5G).
Phase 221: It is inquired if the character received from subroutine TXOUT (Design 5G) is 08. If it be different from 08, a skip is made to phase 227.
Phase 223: Character 02 is transmitted and subroutine TXOUT (Design 5G) is called.
Phase 225: A shifting to figure or letter is transmitted. A call is made to subroutine TXOUT (Design 5G.).

FIG. 5G: Departure of characters subroutine (TXOUT):

Phase 229: Telex departure is initialized.
Phase 231: It is necessary to wait until the departure is ready.
Phase 233: The character comes out.
Phase 235: Return.

FIG. 5H: Subroutine for data transmission by telex. (BCMD):

Phase 237: Telex line 13 is closed by means of line exciter.
Phase 239: Port 99B is asked if line 13 is inverted. Otherwise a skip is made to phase 243.
Phase 241: The computer input testing subroutine is called.
Phase 243: It is inquired if the telex character has arrived. if it has not arrived, a skip is made to phase 251.
Phase 245: It is inquired if it is the Maltese Cross. If it is not, a skip is made to ph. 249.
Phase 247: The indicative is transmitted (Subroutine TXIMD; design 5D).
Phase 249: Conversion from Baudot to ASCII is made and it is stored in the register.
Phase 251: It is asked if computer 43 character has arrived. Otherwise, the sequence is repeated from phase 243 inclusive.
Phase 253: It is inquired if the character is "ESC", if it is so a skip is made to phase 265.
Phase 255: It is asked if it is the 9, in which case a skip to phase 259 is made.
Phase 257: Character is sent by line 13 and a skip is made to phase 243.
Phase 259: The character from the emerging telex register is looked for.
Phase 261: The character is transmitted through telex line 13.
Phase 263: It is asked if it is the file end. If the file has not finished, the sequence is repeated from phase 259 inclusive.
Phase 265: Exciter 69 is ordered to open telex line 13.
Phase 267: Going to control (routine GTCMD; Design 5R).

FIG. 5I: Conversion from ASCII to Baudot codes subroutine (ASBA):

Phase 269: Subroutine is started.
Phase 271: ASCII character is obtained.
Phase 273: A table character is obtained.
Phase 275: The table character obtained is compared with the ASCII character. If they are identical, a skip is made to phase 281.
Phase 277: It is asked if the ASCII character is bigger than 64. If it is smaller or equal, return to phase 273.
Phase 279: It is understood that it has no equivalent in Baudot code. Consequently a shift to phase 301 is made without delay.
Phase 281: It is established that the table order number is equal to Baudot code.
Phase 283: It is asked whether it is bigger than 32, in which case a skip to phase 291 is made.
Phase 285: It is asked if the previous character was a letter, in which case a skip to phase 299 is made.
Phase 287: The last letter character is memorized.
Phase 289: The change to letter is transmitted.
Phase 291: As the number is bigger than 32, to this number is subtracted 32.
Phase 293: It is asked if the previous character was a figure, in which case a skip is made to phase 299.

-continued

| Phase 295: | The last figure character is memorized. |
| Phase 297: | The change to figure is transmitted. |
| Phase 299: | The character is transmitted. |
| Phase 301: | Return. |

FIG. 5J: Baudot to ASCII (BAAS) codes conversion subroutine:

| Phase 303: | This subroutine is initiated. |
| Phase 305: | Baudot character is obtained. |
| Phase 307: | It is verified if it is a letter symbol, otherwise a skip is made to phase 311. |
| Phase 309: | D.E.S. is charged with a zero and a skip is made to phase 321. |
| Phase 311: | It is asked if it is a figure symbol. Otherwise a skip is made to phase 315. |
| Phase 313: | D.E.C. is charged with 32 and a skip is made to phase 321. |
| Phase 315: | The table pointer is charged. |
| Phase 317: | The table pointer + the Baudot character + D.E.S. are added up. |
| Phase 319: | ASCII code is obtained from the table. |
| Phase 321: | Return. |

FIG. 5K: Routine to input the register of telex messages coming from computer 43 (COBU)

| Phase 323: | The routine is initiated. |
| Phase 325: | The character of the computer 43 is read. |
| Phase 327: | It is asked if it is the delete key. Unless it is, skip has to be made to Phase 331. |
| Phase 329: | The last character just written is deleted. |
| Phase 331: | It is asked whether the character is "ESC." Unless it is, skip has to be made to Phase 335. |
| Phase 333: | Go to command routine. |
| Phase 335: | The character is stored in register. |
| Phase 337: | It is asked whether the register is full. If not the sequence is repeated from Phase 325 on. |
| Phase 339: | It is determined that the register shows a condition of error. |
| Phase 341: | An error message is set to be displayed on screen 47. |

FIG. 5L: Routine to write a character on screen 47 (CO):

| Phase 343: | Serial line RS232 is initialized. |
| Phase 345: | It is asked if port 99A output is ready. Otherwise, it is awaited until it is ready. |
| Phase 347: | Sending of a character through the line. |
| Phase 349: | Return. |

FIG. 5M: Routine for entering a character from keyboard 45 (GETCH):

| Phase 351: | Serial line RF232 is initialized. |
| Phase 353: | It is asked if there is a disposable character. As long as there is not any, iteration is done upon this phase 353. |
| Phase 355: | The character is read. |
| Phase 357: | Return. |

FIG. 5N: Routine for asking if it is desirable to erase the emerging telexes register (TRE2):

| Phase 359: | A call is made to subroutine MPR2 (Design 50). |
| Phase 361: | Response from subroutine MPRE2 is received. |
| Phase 363: | Unless the response is affirmative, a skip is made to phase 367. |
| Phase 365: | The register is erased. |
| Phase 367: | Return. |

FIG. 5O: Subroutine to show question on screen 47 (MPRE2):

| Phase 369: | The number of characters to be shown on screen are initialized. |
| Phase 371: | A character is sent to screen 47. |
| Phase 373: | Iteration is made upon the previous phase 371, unless it be the last character. |
| Phase 375: | Return. |

FIG. 5P: Routine for charging of answerback (KI):

| Phase 377: | A character counter is initialized. |
| Phase 379: | A character is entered from keyboard 45. |
| Phase 381: | The character is stored in random access memory 97. |
| Phase 383: | It is asked if it is the last character. If it is not the last, a return is made to phase 379. |
| Phase 385: | Return. |

FIG. 5Q: Routine for autocharging of the answerback (AUK):

| Phase 397: | A luminous point is sent to the screen. |
| Phase 399: | Command and skip table is charged in the random access memory 97. |
| Phase 401: | A character is obtained. |
| Phase 403: | It is asked if it is equal to the command table. Otherwise, a skip is made to phase 407. |
| Phase 405: | The program counter is charged with the skip table direction and routine is finished. |
| Phase 407: | The table pointer is incremented. |
| Phase 409: | It is asked if it is the last command of the table. Otherwise, a return is made to phase 403. |
| Phase 411: | It is established that there is a command error. |
| Phase 413: | An "ERROR" message is printed on screen 47 and a return is made to phase 401. |

Figure 5S:
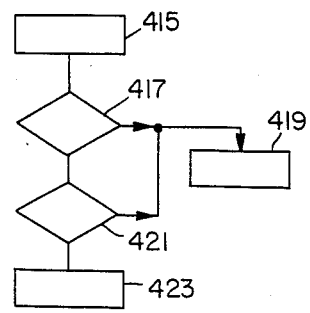

FIG. 5S: Subroutine for testing computer 43 (TSIMP) input:

| Phase 415: | Entrance of keyboard 45 is read. |
| Phase 417: | It is asked if there is a character. If there is one, a skip is made to phase 421. |
| Phase 419: | Return. |
| Phase 421: | It is asked if the character is "ESC". Otherwise, a return is made to phase 419. |
| Phase 423: | If the character is "ESC" a skip is made to the command input. |

It is to be understood that when putting this invention into practice, modifications may be introduced in connection with certain details concerning the manufacturing and configuration of the same, but provided that they do not depart from the fundamental principles of the invention, they are to be construed in accordance with the following claims:

What is claimed is:

1. An intelligent interface for connecting a personal computer or the like to a communication line in order to transform it into a telex transceiver, said personal or similar computer including an input and output port through which it is possible to receive and/or transmit texts in the accepted characters format, according to a conventional telex norm, and/or receive and/or transmit messages to or from the interface, and a medium of visualization of the text received and to be transmitted, said intelligent interface comprising: a call detector means connected to the communication line; a connecting means in circuit with said line having control means for opening and closing the interface to an input signal to the said call detector means from said communication line; a Baudot signal receiver means having a data input connected to the communication line through said connecting means; a character analyzer means connected to an output of said Baudot signal receiver means that includes command and text detector means; a received texts memory means connected to the output of said Baudot signal receiver means through said character analyzer means and an output connectable to an input of the medium of visualization of the text received, a line exciter means having an output connected to said communication line; Baudot signal transmitter means connected to an input of said exciter means; emerging texts memory means connected to an input of said Baudot signal transmitter means; a parallel to serial converter means which has an output connected to said emerging texts memory means, and an input connected to said input and output port; an answerback memory means connected between said character analyzer means and said Baudot signal transmitter means; an addressees' telex numbers memory means connected to said input and output port; and a dial connected between said addressees' telex numbers memory means, and said line exciter means.

2. The intelligent interface of claim 1, wherein said call detector means comprises a line polarity detector.

3. The intelligent interface of claim 2, wherein said polarity detector comprises a photo emitting diode electrically connected between the said communication line and a phototransistor optically coupled with said photo emitting diode.

4. The intelligent interface according to claim 1, wherein said connecting means comprises an opto-coupled unit whose input side is connected with the said communication line and whose output side is connected to the said Baudot signal receiver means.

5. The intelligent interface in accordance with claim 4, wherein said line exciter means embodies a transistor whose input is connected to said Baudot signal transmitter means and a relay which comprises a pair of contacts normally open, connected with said communication lines, and a control coil magnetically coupled with said pair of contacts and electrically connected to the output of the said exciter-transistor.

6. The intelligent interface according to claim 5, wherein said Baudot signal receiver means embodies a Baudot to ASCII converter; and said Baudot signal transmitter means embodies a converter from ASCII to Baudot.

7. The intelligent interface of claim number 6, wherein said Baudot to ASCII converter and said ASCII to Baudot converter embody a universal synchronous/asynchronous transceiver.

8. The intelligent interface of claim 7, wherein the universal synchronous/asynchronous transceiver has a data output connected to the said exciter-transistor, a data input connected to said opto-coupled unit and an input connected to the said phototransmitter which corresponds to said control means for closing of the connecting unit.

9. The intelligent interface of claim 8, which includes a medium of visualization of texts received which comprises a printer.

10. The intelligent interface in accordance with claim 1, wherein said received texts memory means is connected to the input of the said input and output port and wherein said medium of visualization of said received text comprises a cathode ray tube screen of the said computer.

11. The intelligent interface of claim 1, wherein said character analyzer means includes an end of message detector and an answerback request detector.

12. The intelligent interface of claim 11, which includes a micro data processing device comprising said end of message detector, said answerback request detector, and dial.

13. The intelligent interface of claim 12, wherein said micro data processing device comprises said addresses' telex numbers memory means.

14. The intelligent interface, according to claim 11, wherein addressees' telex numbers memory means possesses a reading input connected to a schedule comparator, which in turn is connected to a clock and a sending schedules memory having an input connectable to said input and output port.

15. The intelligent interface according to claim 14, wherein said Baudot signal transmitter means is connected to means for generating a request for addressees' answerback signal and said Baudot signal receiver means is connected to the input of an addressee answerback verifier.

* * * * *